COLOR TELEVISION TEST SIGNAL GENERATOR

Filed June 9, 1954 7 Sheets-Sheet 1

INVENTORS
FRANCOIS R.C. BERNARD
& JOHN W. WENTWORTH
BY [signature]
ATTORNEY

INVENTORS
FRANÇOIS R.C. BERNARD
& JOHN W. WENTWORTH
BY [signature]
ATTORNEY

Feb. 9, 1960 F. R. C. BERNARD ET AL 2,924,647

COLOR TELEVISION TEST SIGNAL GENERATOR

Filed June 9, 1954 7 Sheets-Sheet 4

INVENTORS
FRANÇOIS R.C. BERNARD
& JOHN W. WENTWORTH
BY Olin V. Mitchell
ATTORNEY INVENTORS
FRANCOIS R.C. BERNARD AND
JOHN W. WENTWORTH
BY [signature]
ATTORNEY Feb. 9, 1960 F. R. C. BERNARD ET AL 2,924,647

COLOR TELEVISION TEST SIGNAL GENERATOR

Filed June 9, 1954 7 Sheets-Sheet 6

INVENTORS
FRANÇOIS R.C. BERNARD
& JOHN W. WENTWORTH
BY [signature]
ATTORNEY

INVENTORS
FRANÇOIS R.C. BERNARD
& JOHN W. WENTWORTH
BY [signature]
ATTORNEY

United States Patent Office 2,924,647
Patented Feb. 9, 1960

2,924,647

COLOR TELEVISION TEST SIGNAL GENERATOR

François R. C. Bernard, Collingswood, and John W. Wentworth, Haddonfield, N.J., assignors to Radio Corporation of America, a corporation of Delaware Application June 9, 1954, Serial No. 435,591

5 Claims. (Cl. 178—5.4)

This invention relates to test apparatus for color television receivers and, particularly, to apparatus for use in generating a signal for testing the phase alignment of the subcarrier demodulator circuits and the gain adjustment of the matrixing circuits employed in receivers and monitors for converting the received color signals to a form suitable for image-reproducing purposes.

By way of background information it is to be noted that, in accordance with the present color television standards as promulgated by the Federal Communications Commission, the signal which is transmitted consists of a luminance signal and one or more so-called color difference signals. The luminance signal is made up of predetermined proportions of the signals representing a plurality of colors, such as three selected component colors of a subject. The color difference signals are of a character such that, when each is combined with the luminance signal, there is produced a signal representative of one of the selected component subject colors and which may be employed in this form for image-reproducing purposes.

The color difference signals are transmitted on a subcarrier wave having a frequency which is at the relatively high end of the frequency band including the luminance signal. The subcarrier wave has a frequency which is a large odd multiple of one-half of the horizontal or line scanning frequency. By this means, the energy concentrations in the side bands of the color subcarrier wave are interleaved with the discrete energy concentrations of the luminance signal. In view of the fact that all three of the colors are represented in the luminance signal, it is necessary to transmit only two color difference signals. In this case, at a receiver, the third color difference signal may be derived in a suitable manner by proper combination of the two transmitted color difference signals and the luminance signal.

In transmitting the color difference signals, it is the practice to modulate them respectively on two quadrature phases of the subcarrier wave. Within the frequency range in which both side bands of the color subcarrier wave are transmitted, there is no distortion of the color difference signals. However, since the color subcarrier wave has a frequency which is in the upper region of the pass band of the communication channel, some of the higher color difference modulating signals are transmitted in only one of the color subcarrier wave side bands. In this single side band region, therefore, it is the practice to transmit only a single color difference signal in order to avoid signal distortion.

At a receiver the color difference signals for proper combination with the luminance signal must be derived from the subcarrier wave modulating signals. For this purpose, a converter is required. Such a converter has been called, because of its character, a matrixing circuit. In the present usage, it will be understood that a matrixing circuit is electronic apparatus for additively and/or subtractively combining signal voltages to change them from one form to another.

By reason of the fact that the "I" and "Q" color-difference signals are not present in an identifiable form in a picture signal, since such a signal is a continuously varying vector sum of the "I" and "Q" components, it is impracticable to attempt to test the phase alignment of a receiver through the use of a transmitted broadcast signal. Hence it is a primary object of the present invention to provide means for synthetically producing subcarrier frequency signals of selected phase and amplitude, whereby the phasing of the demodulators and matrix circuits in a color television receiver or monitor may be checked in a simple, yet quite accurate manner.

In an article by Gloystein and Turner, "The Colorplexer—A Device for Multiplexing Color Television Signals in Accordance with the NTSC Signal Specifications" (Proceedings of the IRE, January 1954), there is described an effective arrangement, including a color bar generator and a colorplexer, for producing a test signal suitable for use with color receivers of the type in question. As stated in the article, the colorplexer requires delicately balanced modulators, precise filters, phase-splitters and highly linear amplifiers for producing the desired signal. Thus, it is another object of the present invention to provide simplified apparatus for synthesizing the results of a "colorplexer" in producing a test signal comprising a plurality of subcarrier wave phases, each representative of a selected color and including a synthetic luminance component.

In accordance with the present invention, apparatus is provided for producing a plurality of bursts of color subcarrier wave frequency, each of said bursts having a different phase and being representative of a selected color. According to a specific embodiment of the invention as described herein, the bursts are representative of the three primary colors, red, green and blue, and their complementary colors yellow, cyan and magenta. The bursts whose phases represent the complementary colors are produced from signals representative of the primary colors, through the agency of means for selectively combining the primary colors with such amplitude and phase as to produce, as a vector resultant, the proper phase and amplitude of the complementary colors. Specifically, in accordance with the present invention, the expensive and precisely balanced equipment of a colorplexer is replaced by simplified gates which need not be linear but which serve, when supplied simultaneously with subcarrier wave energy and keying pulses, to produce the color representative bursts. That is to say, by reason of the fact that the burst-producing gates operate primarily as "on-off" devices, linear transfer characteristics are rendered unimportant for production of the color test signals. In addition to the foregoing, means are provided for deriving from the keying pulses which actuate the gates a luminance or monochrome component of proper amplitude for the test signal. Since, as is understood, proper operation of color television receivers of the present type requires synchronization of a color reference oscillator at intervals normally corresponding to the television line rate, the present signal generator includes means for producing such color oscillator synchronizing information. Means are also provided for adding standard deflection synchronizing pulses to the signal.

While the test generator of the present invention is capable of affording the several test signals described generally above, it accomplishes its results despite a greatly reduced number of tubes as compared with the usual colorplexer-bar generator arrangement and affords greater stability of operation.

Additional objects and advantages of the present invention will become apparent to persons skilled in the art from a study of the following detailed description of the accompanying drawing in which:

Fig. 5 illustrates a test signal which may be derived from the apparatus of the invention together with certain wave forms employed in producing the test signal.

In order that the utility of the instant invention may be fully understood and appreciated, there follows a somewhat detailed description of the color signal specifications set by the Federal Communications Commission and with which the apparatus of the present invention may be advantageously employed.

Figure 1:
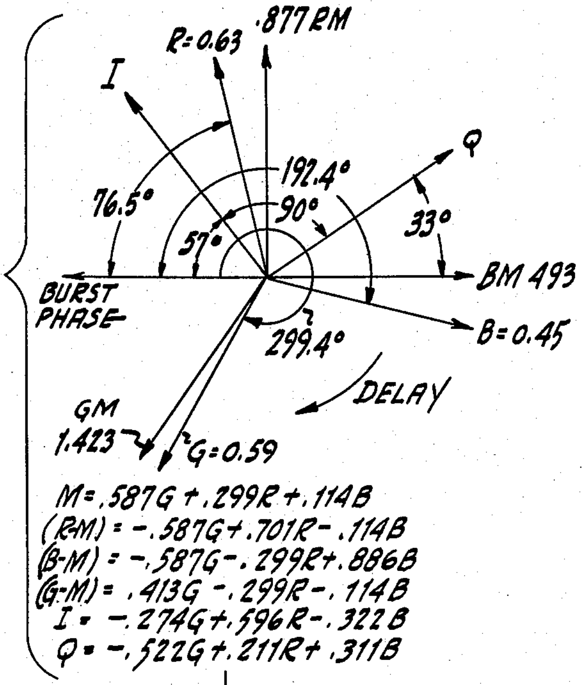
Fig. 1 is a vector diagram together with certain equations representing the relationship of color signals, color difference signals and color subcarrier wave modulating signals in a system with which the invention may be used.

Reference first will be made to Fig. 1 of the drawings for a general description of the color television signalling system. This figure includes a vector diagram in which the red, blue and green color signals are represented by the vectors R, B and G and in which the respective red, blue and green color difference signals are represented by the vectors $(R-M)$, $(B-M)$ and $(G-M)$. It will be understood that this vector diagram represents only the angular relationship between the various signals referred to. The illustrated lengths of the vectors is insignificant, since these lengths change with the different color content of the subject represented by the signals. Also, it will be understood that, with respect to the color difference signals $(R-M)$, $(B-M)$ and $(G-M)$, the representative vectors indicate the angular relationship between such signals if, in fact, the color subcarrier wave were modulated directly by the color difference signals. In the standard system, however, the color subcarrier wave is not directly modulated by these color difference signals, so that the various representative color difference signals are shown merely for reference purposes. In this connection, it is noted that the burst signal vector is 180° out of phase with the blue color difference signal $(B-M)$. The burst signal is employed in a manner now well-known to effect synchronous operation of the color signalling apparatus at the transmitter and receiver.

It also may be noted from the vector diagram of Fig. 1 that the red color difference signal $(R-M)$ leads in phase the blue color difference signal $(B-M)$ by 90°. Accordingly, the burst signal leads the red color difference signal $(R-M)$ by 90°. Furthermore, in accordance with the presently proposed NTSC standards, the system operates by the modulation of the color subcarrier wave directly by two signals designated respectively as the "I" and "Q" signals. From the vector diagram, it may be seen that the "I" signal leads the "Q" signal in phase by 90°. Also, the "I" and "Q" signals lead in phase, respectively, the red color difference signal $(R-M)$ and the blue color difference signal $(B-M)$ by 33°.

In the remaining portion of Fig. 1, the different amplitude relationships between the various vectors representing signals shown in this figure are given by the equations in which the quantities referred to are signal voltages. In order to present the relationships between the various signal voltages as clearly as possible, it will be understood that the various letters and quantities represented by letters grouped together in brackets or parentheses represent the signal voltages indicated by the different letters referring to the different color and the luminance signals. As indicated in Equation 1, the luminance signal "M" is made up of the algebraic sum of the specified quantities of the green, red and blue signals, G, R and B, respectively, representing light of these colors derived from the subject. Also, in Equations 2, 3 and 4 the various color difference signals $(R-M)$, $(B-M)$ and $(G-M)$ are given in terms of the color signals representing the subject. The "I" and "Q" subcarrier wave modulating signals are given in Equations 5 and 6, respectively, in terms of the different color signals representing the subject.

Figure 2:
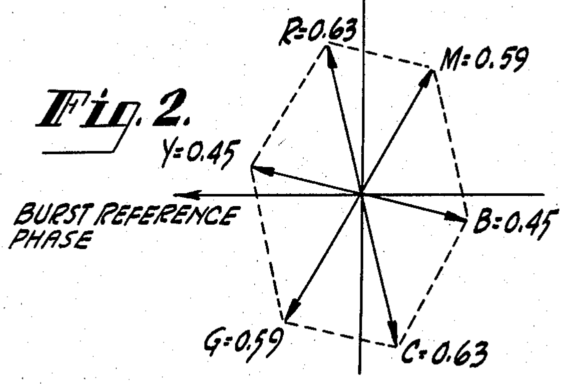
Fig. 2 is a vector diagram to be referred to infra.

From the foregoing description of a color television signal system, it should be apparent that, although only the primary colors have been indicated in the vector diagram of Fig. 1, the complementary colors may also be represented vectorially as the resultants of certain selected primary colors. Thus, for example, Fig. 2 illustrates the manner in which the complementary colors yellow, cyan and magenta may be derived from the primary colors. That is, the vector representing yellow is seen to be the resultant of the vector addition of the red and green vectors. Similarly, the color cyan is the resultant of the green and blue vectors, while the magenta vector is derived from the red and blue vectors. As will appear more fully hereinafter, it is necessary for the gate circuits of the present invention which produce the several bursts of different phase to have specific gain characteristics in order to afford the proper amplitudes for the primary colors, so that addition of the primary colors can produce the proper complementary color phases.

Figure 3:
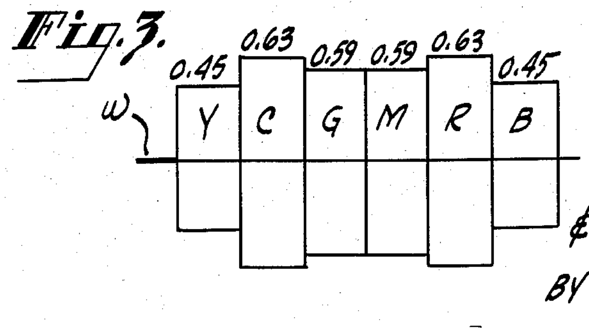
Fig. 3 illustrates a series of bursts representative of one aspect of the present invention (chrominance signal alone)
Figure 4:
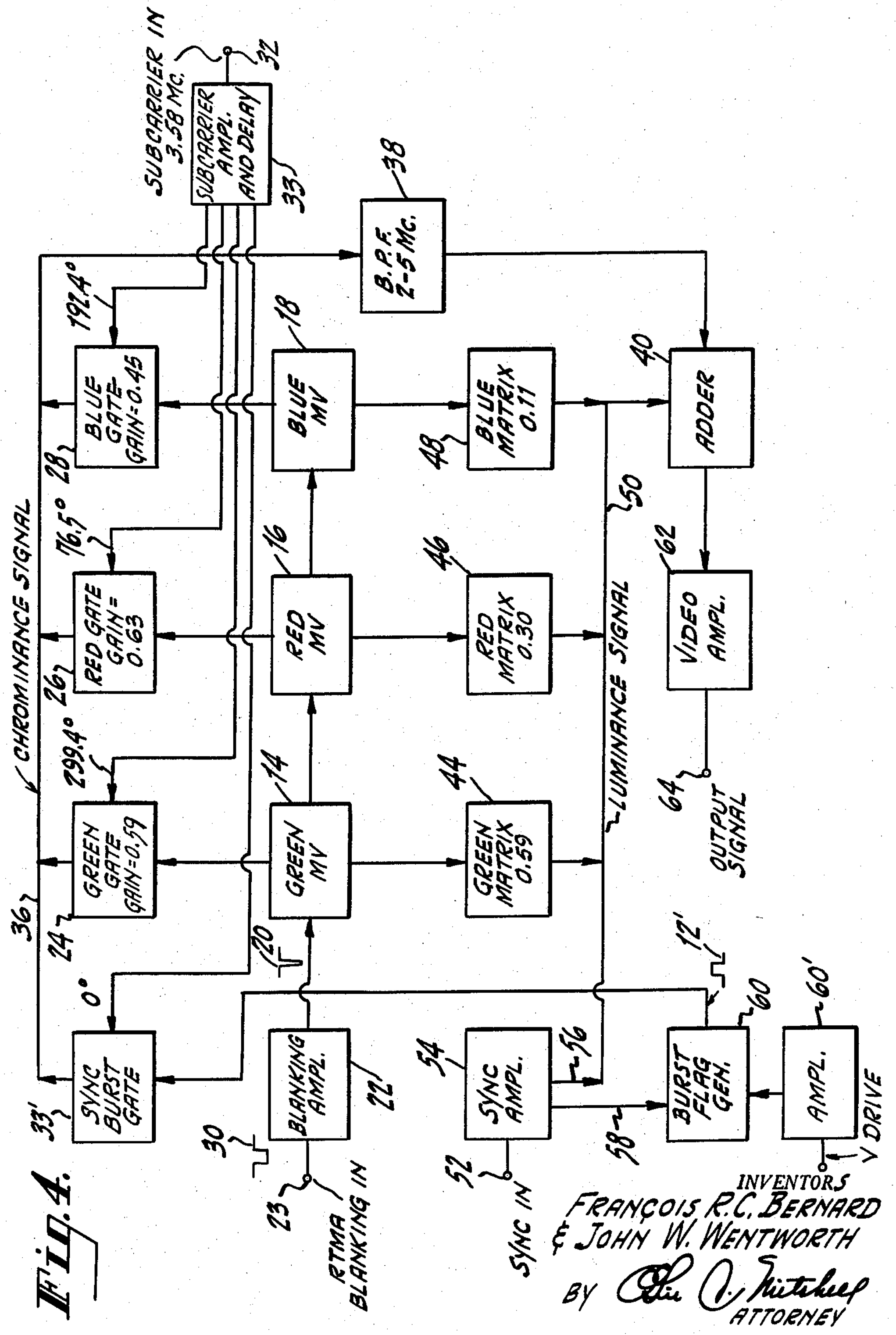

Fig. 3 illustrates a wave form which may be produced, for example, with a colorplexer of the type described in the above-cited Gloystein article. Specifically, the wave form includes a plurality of bursts of subcarrier wave frequency (e.g. 3.58 megacycles). Each of the bursts in Fig. 3 corresponds to that vector in Fig. 2 bearing the same description and will be understood, therefore, as being of the phase shown in Fig. 2 with respect to the arrow labelled "burst reference phase." As has been stated, the type of apparatus normally employed at color television transmitter stations such, for example, as the colorplexer, requires elaborate modulating, mixing and filtering circuits which are not necessary for the production of a test signal (as opposed to broadcast program material). Thus, the present invention, illustrated diagrammatically in Fig. 4, provides simplified means including multivibrators and gates for producing a color television test signal such as that shown in Fig. 5 by the wave form *a*. That is to say, in wave form *a* of Fig. 5 there is shown the signal produced for a single television line interval between the horizontal synchronizing pulses S. Each of the synchronizing pulses S is superimposed on a conventional RTMA blanking pedestal 10 and is followed by a color reference synchronizing burst 12 as specified in the FCC signal standards. A description of the function of the color synchronizing burst 12 may be found, for example, in a publication entitled "Recent Developments in Color Synchronization in the RCA Color Television System," published by the Radio Corporation of America, February 1950. Briefly, it may be stated that the burst 12 of subcarrier wave frequency provides a reference for the subcarrier wave oscillator and color sampling demodulators at the receiver. The blanking pedestal 10 is followed by a white band "W" whose amplitude is selected as unity and which contains no subcarrier wave energy, since white, as is known, comprises the resultant of red, green and blue colors. The white band "W" is followed by color subcarrier bursts such as those shown in Fig. 3 at "Y," "C," "G," "M," "R" and "B." Each of the bursts enumerated is provided with a direct current axis indicated by the dotted lines, each axis being of the specified amplitude and being indicative of the luminance or monochrome component of the test signal. While the apparatus of the present invention, as will be described, provides the test signal with bursts in the order shown (i.e. in decreasing order of luminance), it should be understood that any other sequence may be followed.

Figure 5:
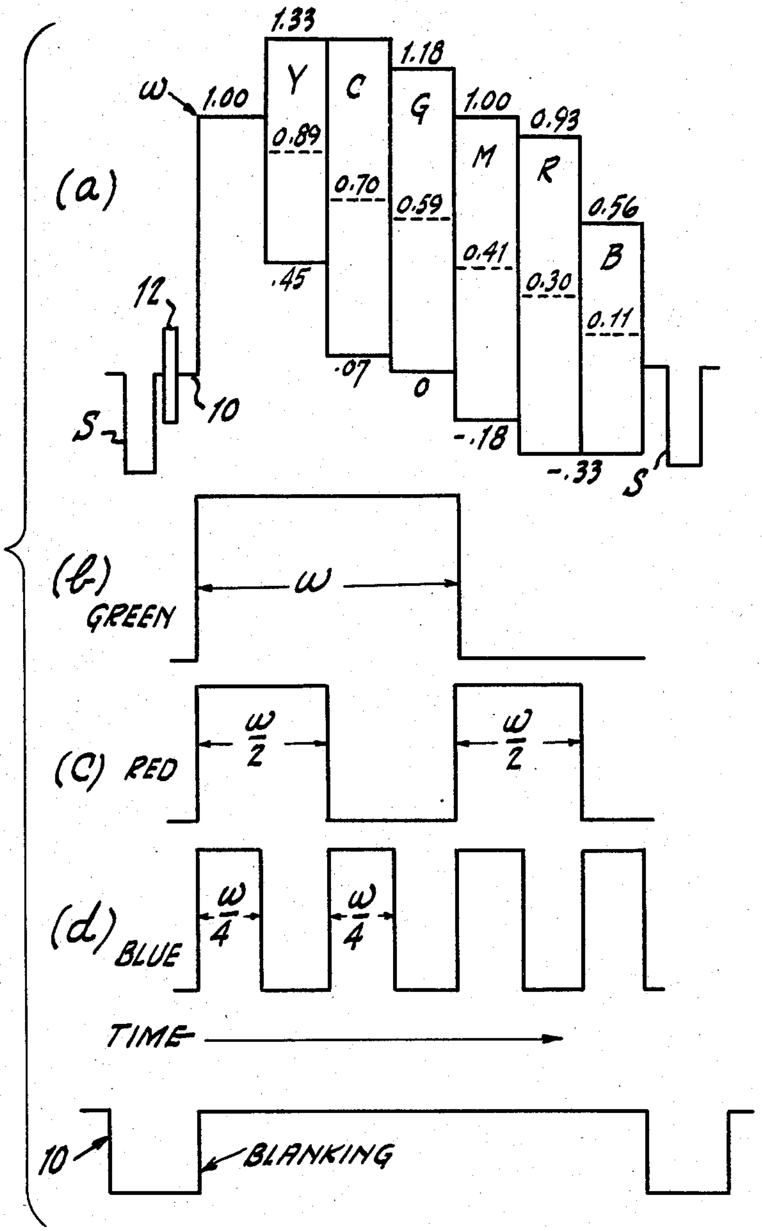
Fig. 5 illustrates, by way of block diagram, an embodiment of the invention.
Figure 6A:
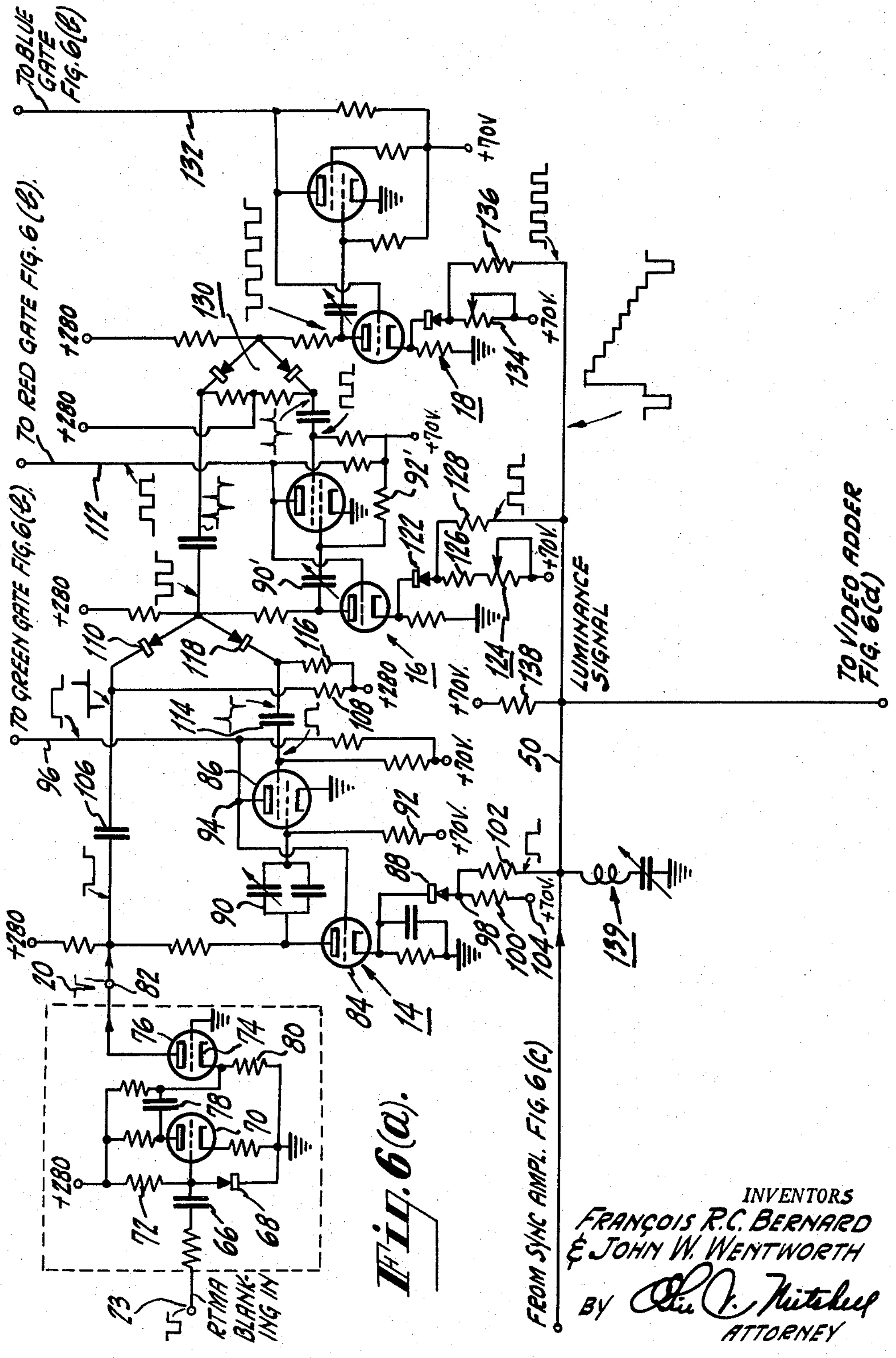
Figs. 6(*a*), 6(*b*), 6(*c*) and 6(*d*) illustrate, by way of schematic circuit diagram, a complete operative embodiment of the invention.
Figure 6B:
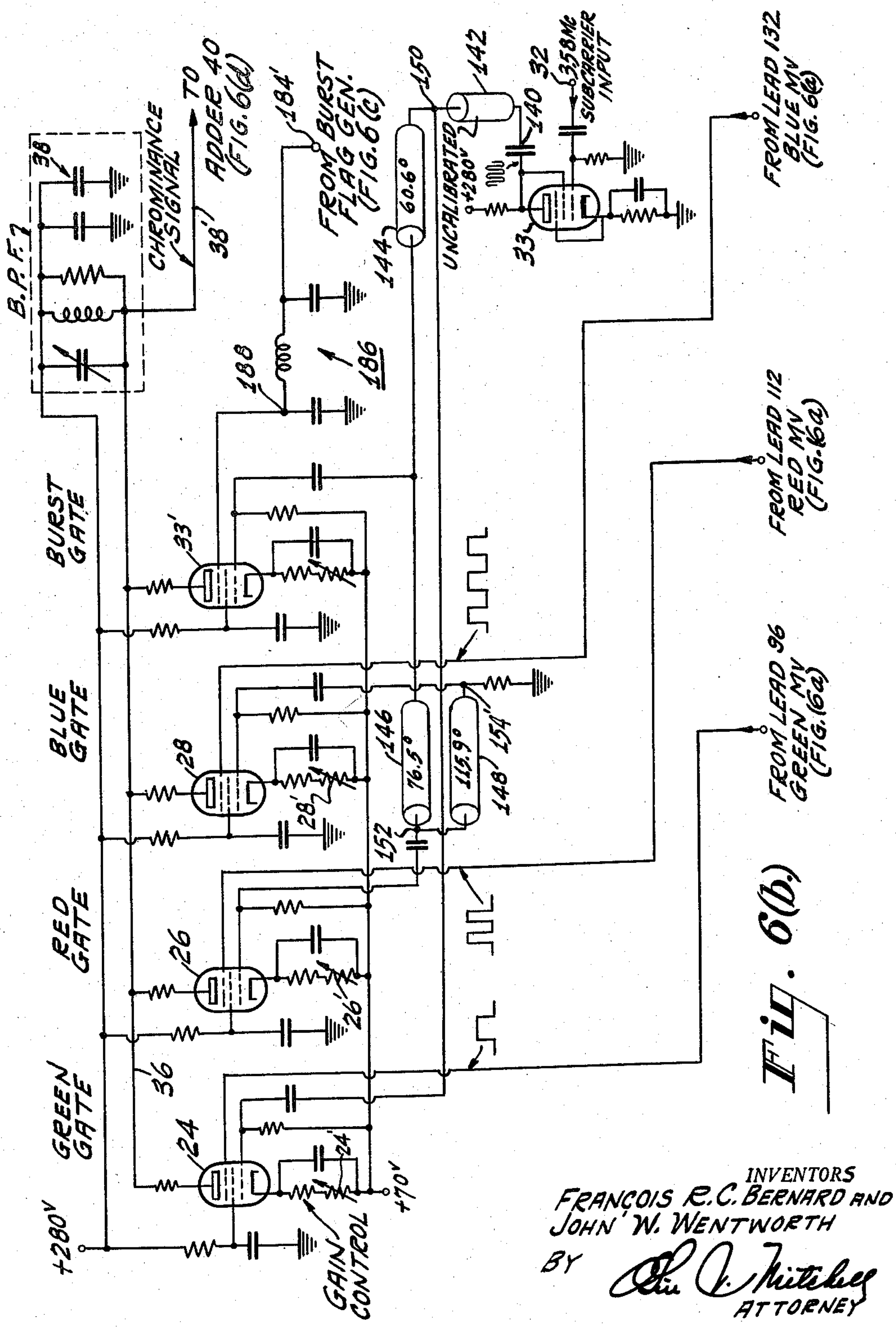
Figure 6C:
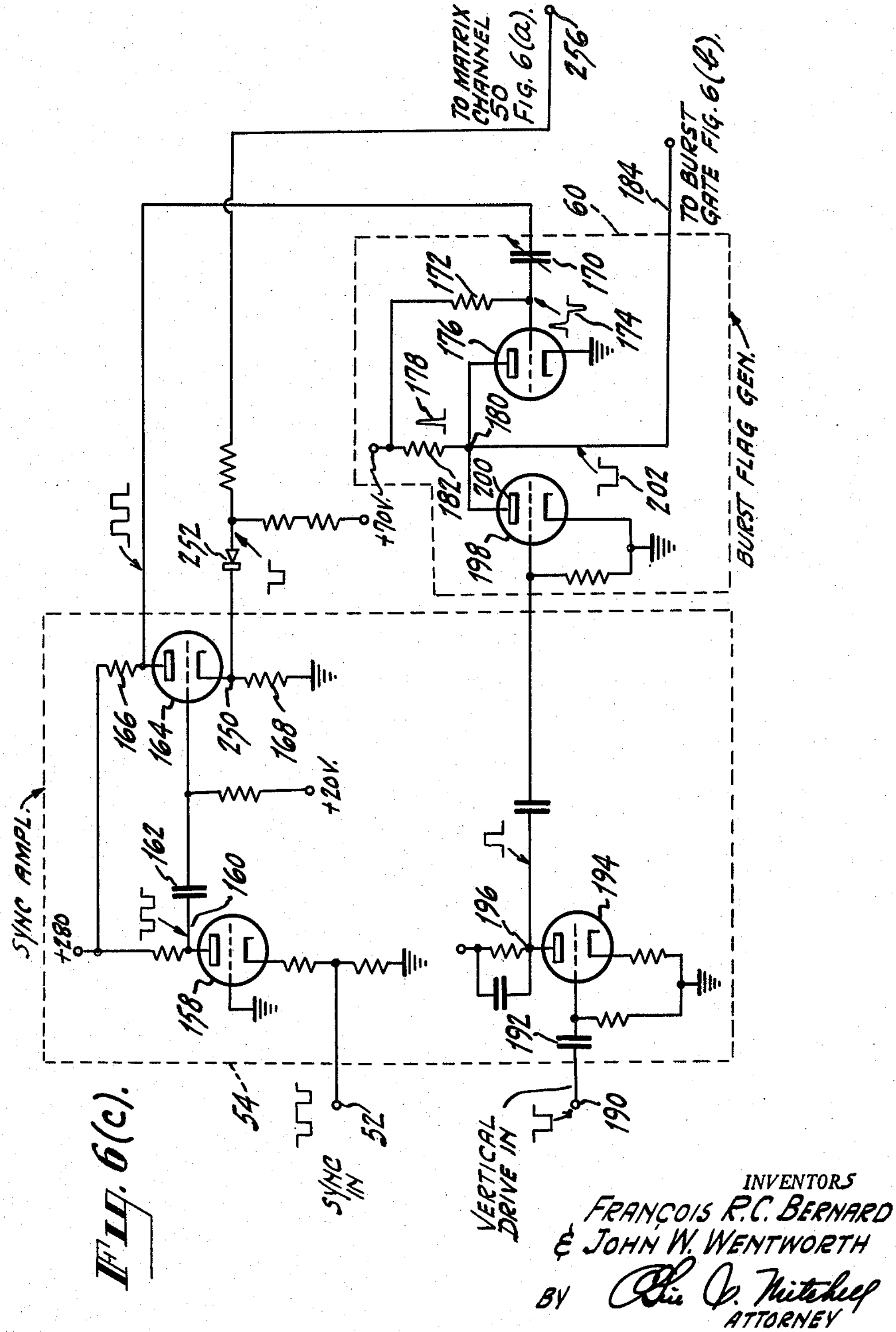
Figure 6D:
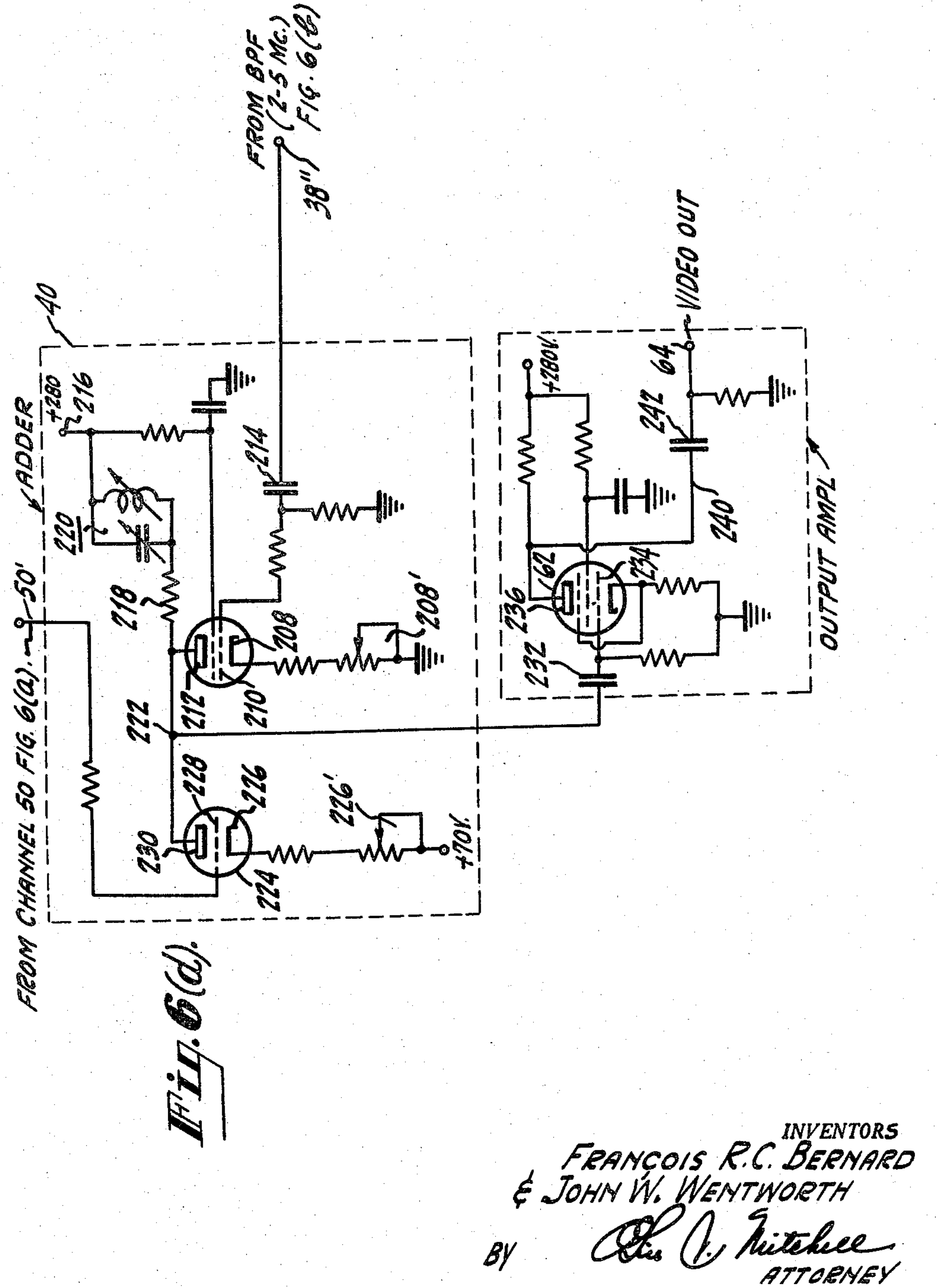

In the block diagram of Fig. 4, the color burst producing circuits from which are derived the keying pulses for the color gates are indicated by the blocks 14, 16 and 18 which are labelled as "Green," "Red" and "Blue" multivibrators. The multivibrators are triggered by pulses or spikes 20 derived in a blanking pulse amplifier stage 22 which is supplied with conventional RTMA blanking pulses at terminal 23. Each of the multivibrators has an output connected to a corresponding gate circuit shown by the blocks 24, 26 and 28 for applying burst gating or keying pulses to the gate circuits. The manner of operation of the multivibrators 14, 16 and 18 is depicted by the wave forms *b*, *c* and *d* of Fig. 5. The wave form *b* of Fig. 5 illustrates the output pulse of the green multivibrator 14 as having a duration "W." The green multivibrator is triggered by the pulse 20 which corresponds in time to the trailing edge of the horizontal blanking pulse 30. The red multivibrator produces pulses (wave form *c* of Fig. 5) of duration $$\frac{w}{2}$$

and is triggered by both the leading and trailing edges of the green multivibrator output pulses. The blue multivibrator 18 produces the output pulses shown in wave form *d* of Fig. 5 having duration $$\frac{w}{4}$$

and is triggered by both the leading and trailing edges of the pulses from the red multivibrator 16. As may be seen from the wave forms *a* through *d* of Fig. 5, all of which are drawn to the same time base, the combination of the primary color wave forms *b*, *c* and *d* will produce a test signal consisting of seven color-bar intervals in the order shown in wave form *a*. The multivibrators and their mode of operation as described thus far do not constitute a part of the present invention but are described and claimed in the copending U.S. application of A. C. Luther, Jr., Serial No. 383,284, filed September 30, 1953, for "Color Bar Signal Generator.".

With the pulses shown in wave forms *b*, *c* and *d* of Fig. 5 applied respectively to the gates 24, 26 and 28 of Fig. 4, the gates are in condition for passing the bursts representative of the primary and complementary colors. The manner in which such burst production is accomplished will now be described. A source, not shown, of subcarrier wave energy of, for example, 3.58 megacycles is connected to terminal 32 for applying a subcarrier of that frequency to an amplifier and delay arrangement 33 which supplies subcarrier wave energy of the phases shown to the burst gate 33′ and to the green, red and blue gates 24, 26 and 28, respectively. Each of the gates 24, 26 and 28 is, therefore, continuously supplied with a wave of subcarrier frequency energy and of a specific phase with respect to the phase of the wave applied to the burst gate 33′. Hence, upon receiving a pulse from its associated multivibrator 14, 16 or 18, each of the gates 24, 26 and 28 will pass a burst of subcarrier frequency and of its assigned phase into a common output channel 36 which is labelled "chrominance signal." Combined output signals from the gates 24, 26 and 28 are, in turn, passed through a band pass filter 38, whose center frequency is substantially that of the subcarrier frequency bursts, to an adder circuit 40.

Further in connection with the production of the bursts representative of primary and complementary colors, and as pointed out in the description of Figs. 2 and 3, it is necessary that the amplitudes of the green, red and blue bursts be of specified values in order that the yellow, cyan and magenta bursts be properly produced by vector addition. These amplitudes are shown in Figs. 2 and 3 as "*G*"=0.59, "*R*"=0.63 and "*B*"=0.45. In accordance with these required amplitudes, therefore, the green, red and blue gates are indicated as having relative gains of those amounts.

From the foregoing, it should be understood that by reason of the time relationships of the pulses produced by the several multivibrators, the composite outputs of the green, red and blue gates will be as shown in Fig. 3, wherein there is illustrated the fact that the first interval "W," namely that corresponding to white, contains no subcarrier frequency energy, by reason of the fact that the red, green and blue bursts cancel each other. The complete test signal shown in wave form *a* of Fig. 5, however, additionally includes a luminance or monochrome component for each of the subcarrier bursts, which components are produced by the matrix circuits 44, 46 and 48 which are connected to the green, red and blue multivibrators 14, 16 and 18, respectively, and in such manner as to receive pulses from those multivibrators corresponding to those shown in wave forms *b*, *c* and *d* of Fig. 5. The matrix circuits constitute means for deriving selected proportions of the several color band pulses with the respective values of 0.59, 0.30 and 0.11. These values will be recognized by those skilled in the art as being the luminance constants selected in the interest of the "constant luminance" type of system described in an article entitled "Principles of NTSC Compatible Color Television," Electronics, February 1952. The outputs of the matrix circuits 44, 46 and 48 are connected to a common channel 50 designated "luminance signal" which, in turn, is connected to a second input terminal of the adder circuit 40. The adder circuit combines the subcarrier bursts and the luminance signal in a conventional manner.

Finally, with regard to the overall operation of the block diagram of Fig. 4, it will be noted that the composite signal to be produced must further include scanning synchronizing pulses S and color synchronizing bursts 12. These are combined with the chrominance and luminance signals as follows: television synchronizing signals of the usual form are supplied from a source (not shown) to the input terminal 52 of a synchronizing pulse amplifier 54 which has two output terminals 56 and 58. The terminal 56 receives amplified versions of the horizontal and vertical synchronizing pulses of the television system and applies them directly into the luminance signal channel 50 so that the synchronizing pulses S are combined with the luminance signal. The second output terminal 58 of the sync amplifier 54 applies horizontal sync pulses to a burst flag generator 60 whose function is that of applying keying pulses 12′ to the burst gate circuit 33′. The keying pulses 12′ are derived from the horizontal sync pulses S in such manner as to follow them closely in time whereby the gate 33′ produces an output burst of subcarrier energy 12 located in time as shown by wave form *a* of Fig. 5. Vertical drive pulses are also applied to the burst flag generator 60 through the amplifier 60′ to prevent the burst gate 33′ from being opened during the vertical synchronizing period. The output of the synchronizing burst gate 33′ is fed into the chrominance signal channel 36 for combination with the color representative subcarrier bursts from the gates 24, 26 and 28. Thus it is noted that, at the output of the adder circuit 40 there is available a complete signal which when amplified by the stage 62 provides at the terminal 64 the composite test signal wave form *a* of Fig. 5. This final signal may be applied to a transmitter for modulation of a radio frequency carrier wave and ultimate transmission or may, alternatively, be applied directly to other television apparatus capable of operating upon a signal of the type shown. For example, the output signal from a terminal 64 may be applied directly to the input terminal of a monitor for checking its operation. Since each of the color representative bursts is in accord with the standard color television signal specifications, it should be understood that a monitor or receiver to which the test signal is applied will reproduce a color image comprising a series of vertical bands in the order white, yellow, cyan, green, magenta, red and blue. Hence a rapid check of the operation of such a monitor or receiver may be determined visually by observing the appearance of the image on its reproducer screen. For accurate test, however, the wave forms at various points in the demodulator and matrix circuits of the equipment under test may be observed on an oscilloscope The condition of the wave forms at the signal terminals of the image-reproducing device of the monitor or receiver, when viewed on an oscilloscope screen, is also indicative of the overall condition of the receiver circuits, since they will indicate the action of the circuits on the several phases of the test signal.

A complete operative circuit which may be employed for performing the functions indicated by the block diagram discussed thus far is illustrated schematically by Figs. 6(*a*), 6(*b*), 6(*c*) and 6(*d*), wherein reference numerals identical to those used in Fig. 4 represent corresponding elements. The RTMA blanking signals are impressed upon the blanking amplifier input terminal 23 and are applied via a capacitor 66 and crystal diode 68 to the control electrode of an amplifier tube 70. The capacitor 66 is charged by the incoming blanking signal and is discharged by the diode 68 through the resistor 72. The time constant of this circuit is such that no substantial discharge of the capacitor 66 occurs during the short interval of the horizontal blanking pulse, so that the horizontal blanking pulses are impressed upon the tube 70. Since television vertical blanking pulses are of much greater duration than the corresponding horizontal pulses, the capacitor 66 effectively discharges through the diode 68 such that no sharp trailing edge results at tube 70. The output signal of the amplifier 70 is capacitively coupled to the cathode 74 of a grounded grid triode 76 which, in turn, amplifies the horizontal blanking pulses. It is to be noted that the input to the grounded grid triode 76 comprises a differentiating circuit made up of the capacitor 78 and resistor 80, whereby the signal actually applied to the cathode 74 is in the form of alternate positive and negative spikes. The spike corresponding to the trailing edge of the horizontal blanking pulse is, therefore, amplified by the tube 76 to produce a negative trigger spike 20 at the terminal 82. Terminal 82 is connected to the input terminal of a monostable multivibrator 14 constituting the green multivibrator of Fig. 4. The specific circuitry of the multivibrator 14 does not constitute a part of the present invention but is described and claimed in essence in the copending U.S. application of A. C. Luther, Jr., Serial No. 343,623, filed March 20, 1953, entitled "Monostable Multivibrator," and now Pat. No. 2,857,512, granted October 21, 1958. The multivibrator 14 comprises three electron tubes or unidirectionally conducting devices, namely, a triode 84, a tetrode 86 and a diode 88. The anode of the triode 84 is connected through the capacitor arrangement 90 to the control electrode of the tetrode 86 which is normally conducting. Thus it will be seen that the negative spike 20 will be coupled through the capacitor 90 to the control electrode of the tetrode 86 whereby to cut off conduction of that tube. The triode 84 is simultaneously rendered conductive for the duration of the pulse shown in wave form *b* of Fig. 5, the duration of the pulse being determined by the time constant of the capacitors 90 and the resistor 92. When the capacitors 90 increase in charge the grid of the tetrode 86 becomes increasingly less negative until the tetrode again is rendered conductive, at which time the triode 84 is again cut off. The output of the multivibrator tetrode 86 available at its anode terminal 94 comprises a positive pulse of duration "*w*" and is applied to the output lead 96 designated for connection to the green gate circuit. During the time of the green pulse shown in wave form *b* of Fig. 5, the anode of the triode 84 produces a negative pulse of duration "*w*," while the screen electrode of the tetrode 86 produces a positive pulse of the same duration. Also during conduction of the triode 84, the diode 88 will be rendered non-conductive by the positive voltage appearing at its cathode, whereby to produce at the terminal 98 a corresponding positive pulse across the resistor 100. This pulse developed at terminal 98 is applied through the resistor 102 to the luminance signal channel 50 with predetermined amplitude as established by the potential to which the resistor 100 is connected at terminal 104 and the values of resistors 100 and 102.

The negative pulse from the anode circuit of the multivibrator triode 84 is applied to the differentiating circuit comprising the capacitor 106 and resistor 108 which produces alternate negative and positive spikes corresponding to the leading and trailing edges of that pulse. The negative spike is passed by the crystal diode 110 as a trigger impulse for the red multivibrator 16 which may be substantially identical to the green multivibrator 14 with the exception of having different values for its time constant circuit 90', 92', whereby its output pulse at lead 112 is a positive pulse of duration $$\frac{w}{2}$$

(wave form *c* of Fig. 5). Simultaneously, the positive pulse appearing at the screen electrode of the tetrode 86 of multivibrator 14 is differentiated by the capacitor 114 and resistor 116 to produce alternate positive and negative spikes corresponding to the leading and trailing edges of the green keying pulse shown in wave form *b* of Fig. 5. The negative pulse is passed by the crystal diode 118 whereby to trigger the multivibrator 16 again so that its second output pulse of duration $$\frac{w}{2}$$

begins substantially coincidentally with the trailing edge of the green key pulse. Two positive pulses of duration $$\frac{w}{2}$$

are also available at the terminal 120 in circuit with the output diode 122 of the multivibrator 16 and their amplitude is determined by the setting of the variable resistor 124 in conjunction with the values of the resistors 126 and 128. The variable resistor 124 may be adjusted to change the amplitude of the pulse to have its desired value. The negative and positive pulses produced by the triode and tetrode respectively of the multivibrator 16 are applied through the differentiating circuits indicated generally at 130 to the blue multivibrator 18, so that the blue multivibrator produces pulses beginning at the leading and trailing edges of the red multivibrator output pulses and of duration $$\frac{w}{4}$$

These blue output pulses are shown at the output lead 132 designated for connection to the blue gate circuit. In a manner similar to that described in conjunction with the output diodes 88 and 102 of the multivibrators 14 and 16, respectively, the circuit 18 produces four positive pulses of duration $$\frac{w}{4}$$

whose amplitude is determined by the setting of a variable resistor 134 in combination with the resistor 136. The pulses derived from the diodes in the cathode circuits of the three multivibrator triodes are all applied to the common channel 50 so that they are combined across a common load impedance shown as the resistor 138. By properly setting the values of the resistors in the cathode output circuits of the multivibrators, which circuits constitute the matrix circuits 44, 46 and 48 of Fig. 4, the luminance signal across the resistor 34 will have the proper relative amplitudes of 0.59 G, 0.30 R and 0.11 B. Moreover, the addition of the several luminance pulses during those times when two of them occur at the same time, will produce the proper luminance values for the yellow, cyan and green signals shown in Fig. 5, namely, 0.59 Y, 0.70 C and 0.41 M.

From the foregoing, it will be understood that the multivibrators 14, 16 and 18 of Fig. 6(*a*) produce the luminance signal in channel 50 and the gating pulses shown in wave forms *b*, *c* and *d* of Fig. 5 for application, respectively, to the green, red and blue gate circuits of the apparatus. A series tuned circuit 139 resonant at the subcarrier frequency, bypasses any subcarrier energy to "ground," thereby presenting a "clean" luminance signal.

Fig. 6(*b*) illustrates, inter alia, the green, red and blue gates as comprising the pentodes 24, 26 and 28, each of which includes in its cathode circuit, and connected to a source of fixed potential, a variable resistor or gain control designated by the reference numerals 24', 26', and 28'. The suppressor grids of the pentodes 24, 26 and 28 are designated for connection to the output leads of the multivibrators 14, 16 and 18 (Fig. 6(*a*)). That is to say, the suppressor grid of the pentode 24 is designated for connection to the output lead 96 of the green multivibrator 14, while the corresponding electrodes of the cathodes 26 and 28 are adapted to be connected to the output leads 112 and 132 of the red and blue multivibrators, respectively. A source of subcarrier wave (not shown) supplies the 3.58 megacycle wave to terminal 32 for application to a conventional video frequency amplifier tube 33. The amplified subcarrier wave is then coupled via a capacitor 140 to the input of an accurately cut delay line comprising an uncalibrated section 142 and the sections 144, 146 and 148. The first tap on the delay line, namely, the tap 150 provides subcarrier frequency energy to the control grid of the green gate pentode 24. The second tap 152 provides subcarrier wave energy delayed 60.6° from the first tap to the control electrode of a sync burst gating pentode 33' which comprises a circuit substantially identical to those described for the green, red and blue burst gates 24, 26 and 28. A third tap 154 provides subcarrier energy delayed an additional 76.5° to the control electrode of the red gate pentode 26, while the final tap 154 connected to the end of a delay line portion which provides an additional 115.9° delay supplies subcarrier energy of that phase to the control electrode of the blue gate pentode 28. Referring again to Fig. 1, it may be seen that the phases of the subcarrier wave applied to the several gates in Fig. 6(*b*) from the delay line sections correspond properly to the phases of the burst reference phase of the red, blue and green vectors in Fig. 1. Thus, for example, the subcarrier phase applied to the pentode 33' lags the green phase applied to the tube 24 by 60.6° (corresponding to the indication in Fig. 1 that green lags the reference burst by 299.4°). The subcarrier phase applied to the red gating tube 26 lags the burst phase by 76.5°, as is required by the vector diagram of Fig. 1 and, finally, the subcarrier phase applied to the blue gate lags the burst phase by the sum of 76.5° and 115.9° or 192.4°.

As thus far described, the circuits of Figs. 6(*a*) and 6(*b*) provide continuous subcarrier wave energy to the control electrodes of the green, red and blue burst-gating pentodes and the multivibrators 14, 16 and 18 apply positive gating pulses to the green, red and blue gates, respectively, via the leads 96, 112 and 132. It is additionally required that the burst-gating pentode 33' of Fig. 6(*b*) be keyed into conduction in such manner as to afford a synchronizing burst of subcarrier wave and of the specified phase at the time indicated by the reference numeral 12 in wave form *a* of Fig. 5. This keying of the burst gate is accomplished through the agency of the circuitry of Fig. 6(*c*) as follows: the television synchronizing pulses from a source (not shown) are applied to the terminal 52 of the synchronizing pulse amplifier 54 with negative polarity. Specifically, the pulses are applied to the cathode of the grounded grid triode 158 so that they appear in amplified form but with the same polarity at its anode output terminal 160. The amplified sync pulses are applied via the capacitor 162 to the control electrode of a phase splitter 164 comprising a triode having anode and cathode load resistors 166 and 168, respectively. The positive pulses derived from the anode load impedance 166 are differentiated by the capacitor 170 and resistor 172 to provide alternate positive and negative spikes as indicated at 174 which are, in turn, applied to the control electrode of the tube 176 which forms a part of the "burst flag generator" 60. The triode 176 is biassed so that the positive spikes applied to its control electrode overdrive the tube; the negative spikes, however, produce a positive impulse 178 at the terminal 180 in its anode circuit (i.e. across the load resistor 182). Terminal 180 is indicated for connection via the lead 184 to the burst gate of Fig. 6(*b*). Referring to Fig. 6(*b*), it will be seen that the lead 184 of Fig. 6(*c*) is designated for connection to the terminal 184' which is connected to the input of a delay network 186 whose output terminal 188 is connected to the suppressor electrode of the synchronizing burst gate tube 33'. The timing of the pulse 178 applied to the burst gate 33' will be understood from the fact that the negative spike of the band 174 corresponds to the trailing edge of the horizontal sync pulses. By suitably varying the capacitor 170 in the control electrode circuit of the tube 176 of the burst flag generator, it is possible to set up the width of the reference burst (8 to 10 cycles). The delay network 186 serves to delay the pulse which is applied to the burst gate 33' by about 0.6 microsecond.

Since it is undesirable to produce color synchronizing bursts during the vertical synchonizing intervals of the television sequence, means are additionally provided for inactivating the burst flag generator during vertical synchronization. Such means will now be described. Vertical drive pulses which are ordinarily produced in the synchronizing generator such as would normally be employed for applying the pulses to the terminal 52, for example, are applied to the terminal 190 with negative polarity. The negative drive pulses are coupled via the capacitor 192 to the control electrode of a triode amplifier 194 which provides at its output terminal 196 a positive version of the drive pulses. Terminal 196 is capacitively coupled to the control electrode of a triode amplifier 198 whose anode 200 is connected to terminal 180 so that the tube 198 has in common with the tube 176 the load resistor 182. Tube 198, therefore, amplifies the positive-going drive pulses applied to its control electrode, so that there is produced at the terminal 180 a negative pulse 202 whose duration encompasses the synchronizing portion of the vertical synchronizing interval. The negative pulses 202 prevent the pulses 178 from the triode 176 from keying the synchronizing burst gate 33' into conduction. In this manner, the synchonizing bursts are prevented from occurring during vertical synchronizing periods.

As described in connection with the block diagram of Fig. 4, the output signals of the gates 33', 24, 26 and 28 are combined in a common lead 36 and applied to a band pass filter 38. Specific circuitry for performing this function is also shown in Fig. 6(*b*). The anodes of the pentodes 24, 26, 28 and 33' are connected through respective parasitic suppressor resistors to the common lead 36 which terminates at the input of a band pass filter 38 whose components are tuned to the 2-to-5-megacycle band and which has a parallel resistor for lowering its "Q." The output of the band pass filter 38 of Fig. 6(*b*) is available at the lead 38′ designated for connection to the adder 40. Circuitry suitable for performing the function of the adder 40 of Fig. 4 is shown in Fig. 6(*d*). The adder 40 in Fig. 6(*d*) comprises a tetrode 206 having a cathode 208, control electrode 210 and anode 212. The input terminal 38″, designated for connection to the lead 38′ at the output of the band pass filter 38, receives the combined subcarrier bursts from the filter and the bursts are applied via the capacitor 214 to the control electrode 210. The anode 212 is connected to a source of positive operating potential indicated at the terminal 216 through a load resistor 218 and the tuned circuit 220 which may have a pass band of two to five megacycles. There will, therefore, appear at the output terminal 222 an amplified version of the plurality of bursts from the gates of Fig. 6(*b*). As stated in connection with Fig. 4, however, the luminance signal from the channel 50 (Fig. 6(*a*)) must also be added to the burst in order to provide their luminance components. Thus the adder 40 includes a second tube 224 having a cathode 226, control electrode 228 and an anode 230. The control electrode 228 is designated for connection via a terminal 50′ to the luminance signal channel 50 of Fig. 6(*a*) so that it receives the signal therefrom. Since the anode 230 of the tube 224 is connected to the positive potential terminal 216 through the load resistor 218, the amplified luminance signal will also appear at terminal 222 in combination with the subcarrier bursts. Gain control circuits 208′ and 226′ connected to the cathodes of the adder tubes 206 and 224 are provided so that the relative gains of the luminance and burst signals may be properly adjusted. The combined signals including luminance components and bursts are coupled via a capacitor 232 to the control electrode 234 of the video amplifier stage 62 which comprises a conventional pentode amplifier. The anode 236 of the tube 62 includes a load resistor 238 so that the combined subcarrier and luminance signal is available in amplified form at the lead 240. The signal is then coupled via capacitor 242 to the output terminal 64 corresponding to the terminal bearing the same reference numeral in Fig. 4.

By reason of the fact that the green, red and blue gates 24, 26 and 28 are keyed with pulses of the widths shown in wave forms *b*, *c* and *d* of Fig. 5, and by virtue of the fact that the subcarrier energy applied to the enumerated gates has the several phases indicated, the composite output signal will also include, in addition to the synchronizing, red, green and blue bursts, the cyan, yellow and magenta burst phases, as explained in connection with the vector diagram of Fig. 2.

Finally and in the interest of completeness of description, it may be noted that the composite output signal is provided with its synchronizing pulses S from the phase splitter 164 mentioned in the description of Fig. 6(*c*). As shown, the cathode of the phase splitter 164 is connected to a point of fixed potential through a load resistor 168. Thus there will appear at the terminal 250 a negative version of the synchronizing pulses applied to the tube 164. These pulses are clipped by a crystal diode 252 to render them free of extraneous modulation and are applied to the terminal 256 designated for connection to the luminance channel 50 of Fig. 6(*a*). This connection applies the negative synchronizing pulses to the channel 50 for combination with the luminance components applied to that channel from the matrices associated with the multivibrators 14, 16 and 18.

From the foregoing, those skilled in the art will recognize the fact that the present invention provides relatively simple apparatus possessing extreme stability for providing a test signal comprising television synchronizing pulses, color sync bursts and a plurality of subcarrier wave bursts of different phases and amplitudes representative of selected colors. Additionally, the subcarrier bursts are provided with luminance components of established values, thereby synthesizing a complete color television signal which may be applied for test purposes directly to monitors or transmitted on a radio frequency carrier for test of receivers in the field. While certain specific color representative burst phases have been described, it should be understood that other phases (e.g. "I" and "Q") may be added to the composite signal by the addition of similar gate circuits and multivibrator keying devices therefor. Moreover, it will be understood, that, although the prior art includes arrangements for producing similar test signals, such prior art arrangements require expensive and complicated modulator circuits and the like as described supra.

Having thus described our invention, what we claim as new and desire to secure by Letters Patent is:

1. A test signal generator for color television apparatus of the type adapted to process a composite signal including a color subcarrier wave whose phase with respect to a reference is representative of the color of an image to be reproduced and a luminance component representative of image brightness and serving as an axis for such subcarrier wave, said generator comprising: a plurality of normally non-conductive gates; a subcarrier wave generator operative to produce a subcarrier wave of fixed frequency; phase shifting means coupled to said generator for producing first and second phases of said wave; means for applying to each of said gates a differently phased wave of subcarrier frequency, such that the different phases represent different colors; pulse producing means for rendering said gates conductive whereby to cause each gate to pass a burst of subcarrier wave; matrix means coupled to said pulse-producing means for additively combining pulses therefrom in such manner as to provide a luminance signal coexistent with said bursts; and means for combining said bursts and said luminance signal in such manner that said luminance signal constitutes a direct current component for said bursts.

2. A test signal generator for color television apparatus of the type adapted to process a television signal including a color subcarrier wave whose phase with respect to a reference is representative of the color of an object in accordance with a predetermined assignment of specific phases to specific colors, said generator comprising: first and second normally non-conductive gates; a subcarrier wave generator operative to produce a subcarrier wave of fixed frequency; phase shifting means coupled to said generator for producing first and second phases of said wave; means for applying to said gates different phases of such subcarrier wave from said phase shifting means, one of said phases being representative of a first color and the other of said phases being representative of a second color; means for applying gating pulses to said gates such that said gates are rendered conductive in such manner that one of said gates has a period of conduction which includes at least a part of the period of conduction of the other of said gates, whereby to cause said gates to pass bursts of subcarrier wave for their periods of conduction; and means for adding the bursts passed by said gates so as to produce three color-representative bursts of subcarrier wave, two of said bursts being representative of said first and second colors and the third such burst having a phase representative of a third color.

3. The invention as defined by claim 2 wherein at least one of said gates comprises an electronic amplifying device and means for controlling the gain of said device whereby to fix the amplitude of bursts passed by said device at a predetermined level with respect to the amplitude of bursts passed by the other of said gates.

4. A test signal generator for color television apparatus of the type adapted to process a television signal including a color subcarrier wave whose phase with respect to a reference is representative of the color of an object in accordance with a predetermined assignment of specific phases to specific colors and a luminance signal representative of the brightness of such object, said generator comprising: first and second normally non-conductive gates; a subcarrier wave generator operative to produce a subcarrier wave of fixed frequency; phase shifting means coupled to said generator for producing first and second phases of said wave; means coupling said phase shifting means to said gates for applying to said gates different phases of such subcarrier wave, one of said phases being representative of a first color and the other of said phases being representative of a second color; pulse generating means for applying gating pulses to said gates such that said gates are rendered in such manner that one of said gates has a period of conduction which includes at least a part of the period of conduction of the other of said gates but in which each of said gates is conductive for a period in which the other of said gates is non-conductive, whereby to cause said gates to pass bursts of subcarrier wave for their periods of conduction; means for adding the bursts passed by said gates to produce three consecutive color-representative bursts of subcarrier including said first and second colors and a third color comprising a combination of said first and second colors; and means operatively connected to said pulse-generating means in pulse-receiving relationship therewith for adding pulses therefrom in such manner as to produce a luminance-representative signal coexistent with said consecutive color-representative bursts.

5. A test signal generator for color television apparatus of the type adapted to process a television signal including a color subcarrier wave whose phase with respect to a reference is representative of the color of an object in accordance with a predetermined assignment of specific phases to specific colors and a luminance signal representative of the brightness of such object, said generator comprising: first and second normally non-conductive gates; a subcarrier wave generator operative to produce a subcarrier wave of fixed frequency; phase shifting means coupled to said generator for producing first and second phases of said wave; means coupling said phase shifting means to said gates for applying to said gates different phases of such subcarrier wave, one of said phases being representative of a first color and the other of said phases being representative of a second color; pulse generating means for applying gating pulses to said gates such that said gates are rendered in such manner that one of said gates has a period of conduction which includes at least a part of the period of conduction of the other of said gates but in which each of said gates is conductive for a period in which the other of said gates is non-conductive, whereby to cause said gates to pass bursts of subcarrier wave for their periods of conduction; means for adding the bursts passed by said gates to produce three consecutive color-representative bursts of subcarrier including said first and second colors and a third color comprising a combination of said first and second colors; means operatively connected to said pulse-generating means in pulse-receiving relationship therewith for adding pulses therefrom in such manner as to produce a luminance-representative signal; and means coupled to said last-named means and to said burst adding means for additively combining said three color-representative bursts with said luminance-representative signal such that said luminance-representative signal constitutes a direct current component for said three color-representative bursts.

References Cited in the file of this patent

UNITED STATES PATENTS

| | | |
|---|---|---|
| 2,527,967 | Schrader | Oct. 31, 1950 |
| 2,733,433 | Morrison | Jan. 31, 1956 |
| 2,742,525 | Larky | Apr. 17, 1956 |
| 2,824,225 | Luther | Feb. 18, 1958 |